US005838246A

United States Patent [19]

Voorhees

[11] Patent Number: 5,838,246

[45] Date of Patent: Nov. 17, 1998

[54] SAFETY APPARATUS FOR OIL DRILLING DERRICK

[75] Inventor: Ronald J. Voorhees, La Jolla, Calif.

[73] Assignee: Luz Marie Vorhees, La Jolla, Calif.

[21] Appl. No.: 855,062

[22] Filed: May 13, 1997

[51] Int. Cl.[6] .......... G09B 21/00

[52] U.S. Cl. .......... 340/685; 340/686; 212/281; 254/269; 180/170

[58] Field of Search .......... 340/685, 686, 340/687, 688; 212/281; 254/269; 180/169, 170

[56] References Cited

U.S. PATENT DOCUMENTS

| | | | |
|---|---|---|---|
| 1,425,569 | 8/1922 | Arnold | 212/281 |
| 1,558,635 | 10/1925 | Rutan | 212/281 |
| 2,379,599 | 7/1945 | Smith | 212/281 |
| 2,744,637 | 5/1956 | Stewart | 212/281 |
| 3,922,789 | 12/1975 | Sarrell | 340/686 |
| 3,924,752 | 12/1975 | Hoofnagle | 212/281 |
| 4,067,447 | 1/1978 | Goss et al. | 212/281 |
| 4,170,308 | 10/1979 | Rogers | 212/281 |
| 4,491,450 | 1/1985 | George | 212/281 |
| 4,560,074 | 12/1985 | Manning | 212/281 |
| 5,263,660 | 11/1993 | Brozik | 212/281 |

*Primary Examiner*—Nina Tong
*Attorney, Agent, or Firm*—Brown, Martin, Haller & McClain, LLP

[57] ABSTRACT

A safety apparatus for a derrick on an oil drilling rig includes a cable having a first end for connection to one side of the derrick at a predetermined location spaced below the crown. A series of pulleys is secured to the oil derrick to define a predetermined path for the cable extending from the fixed first end across the derrick at the predetermined location and then down the derrick to a location adjacent the lower end. The portion of the cable extending across the derrick is positioned in the path of a traveling block as it is pulled up the derrick. An alarm device is linked to the cable to produce an output alarm signal if the cable is pulled up by the traveling block as it approaches the top of the derrick, giving the operator a warning that the traveling block should be stopped to avoid impact with the crown.

28 Claims, 2 Drawing Sheets

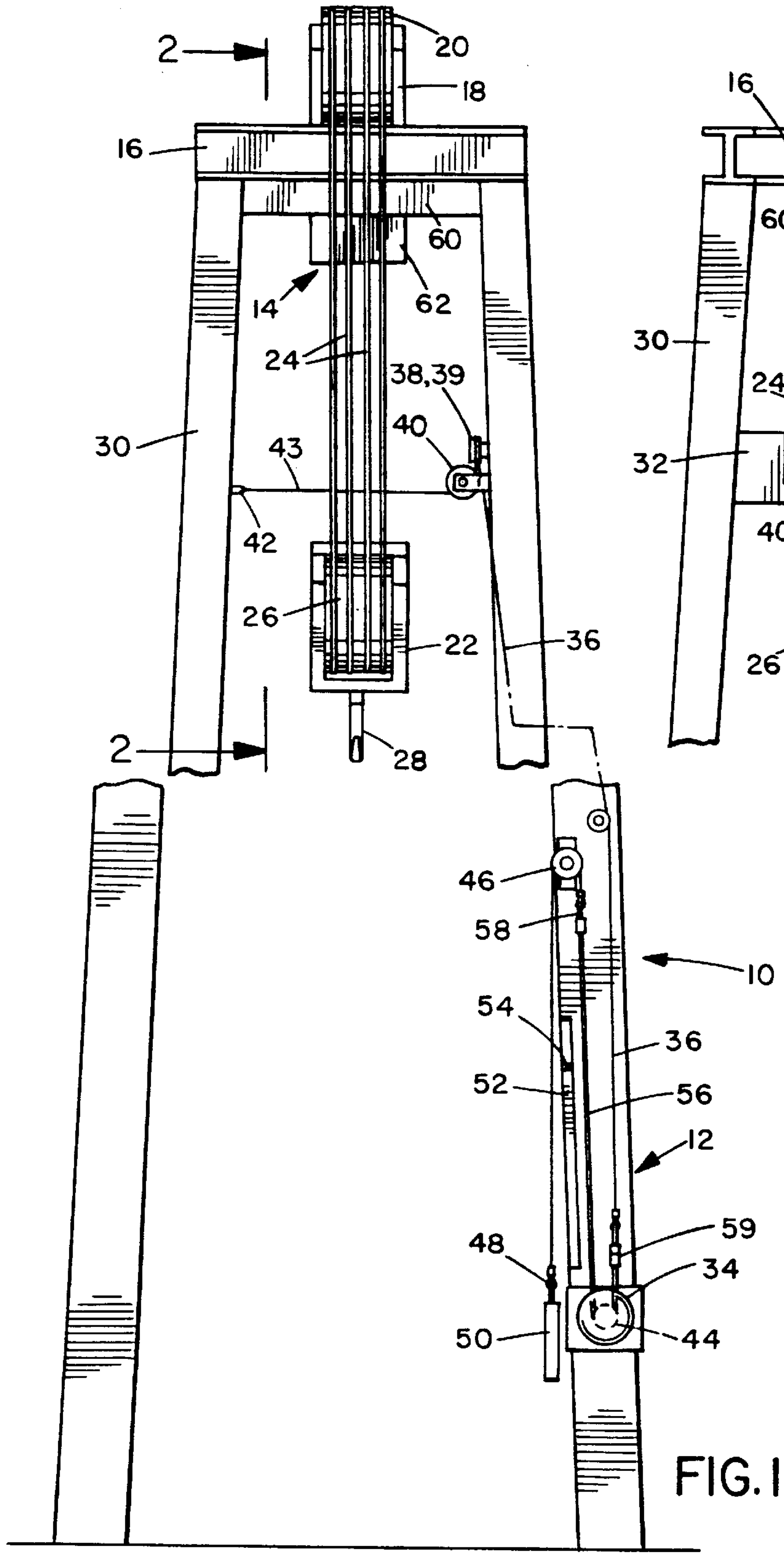
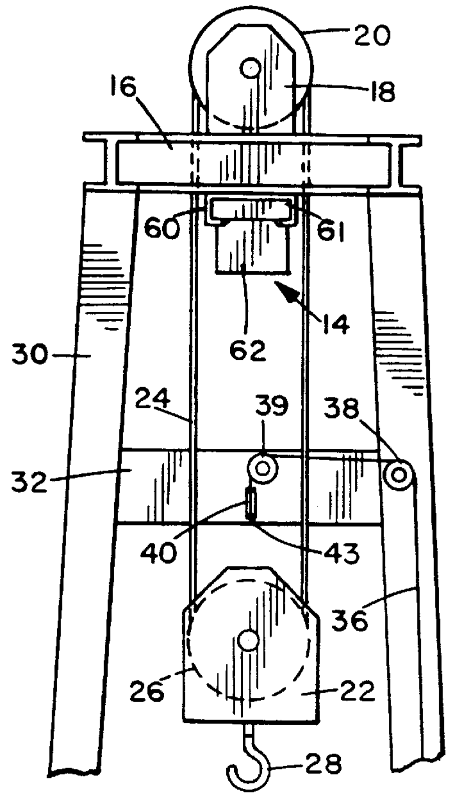
FIG. 2
FIG. 1

SAFETY APPARATUS FOR OIL DRILLING DERRICK

BACKGROUND OF THE INVENTION

The present invention relates generally to safety devices primarily for use on oil drilling derricks on oil platforms or rigs, and is particularly concerned with apparatus for providing a warning when a traveling block approaches the top or crown block of a hoisting assembly on a drilling derrick or a hoisting unit.

Oil drilling derricks typically have hoisting equipment including a crown block at the top of the derrick and a traveling block which is linked to the crown block via a cable and pulley or sheave arrangement, and which travels up and down the derrick by means of a suitable hydraulic drive or the like. A hook is suspended below the traveling block for lifting pipes, drilling equipment and the like. Because of the large size and weight of the traveling block, the pulleys in the crown and traveling block are liable to be damaged if the traveling block travels up far enough to strike the crown block. Additionally, debris as a result of such an impact may fall and possibly injure workers on the platform below. A number of devices have been used in the past to attempt to avoid such problems, but these are subject to various disadvantages.

Typically, to avoid the traveling block striking the crown block, a pair of wooden studs or rails is bolted across the derrick below the crown block, so that the traveling block strikes these rails before it reaches the crown block. However, these have a tendency to be crushed or separated from the derrick on impact, and often fall to the floor or platform, potentially injuring personnel.

Electrical limit switch units have also been used to cut off power to the hoist drive if the traveling block travels too far up the derrick. However, these have proved to be unreliable and prone to failure, and are inoperative in the event of a power shut down or a broken circuit. Additionally, rig personnel sometimes shut off these units for various reasons, and then forget to reconnect the unit. Thus, up to now, there has been no reliable safety device to reduce the risk of damage and injury as a result of a traveling block hitting the crown block when it is raised too far.

SUMMARY OF THE INVENTION

It is an object of the present invention to provide a new and improved safety apparatus for an oil drilling rig.

According to the present invention, a safety apparatus for an oil drilling derrick or hoisting unit is provided, which comprises a cable having a first end for connection to one side of an oil derrick adjacent the top of the derrick, a series of pulleys for securing to the oil derrick to define a predetermined cable path, the cable extending along the path at least partially around the pulleys from the first end so as to extend across the derrick in the path of a traveling block, and an alarm device linked to the cable for actuation by the cable to produce an output alarm signal if the cable is raised by the traveling block approaching the top of the derrick.

The alarm device is preferably an audible alarm such as an alarm bell or buzzer, but may also include a visible alarm. In a preferred embodiment of the invention, the second end of the cable is linked to a counter weight which is raised when the cable is pushed up by the traveling block, and an upright linear scale or yardstick is positioned adjacent the counter weight so that personnel on the platform have an indication of the actual spacing of the traveling block below the crown block when it is approaching the top of the platform. Preferably, the scale has a warning or alarm indicator at a position corresponding to a predetermined position of the traveling block, such as 1' below the crown block, beyond which the traveling block should not be moved, to avoid potential damaging impacts. Thus, personnel on the platform not only have an immediate audible alarm signal when the traveling block is moving too close to the top of the derrick, but also can determine the exact position of the traveling block by looking at the position of the counterweight relative to the scale, which is at their eye level, rather than looking up toward the top of the derrick.

Preferably, a bumper device is also positioned at the top of the derrick beneath the crown block to stop the traveling block if personnel should ignore the warning bell and counterweight position. The bumper device preferably comprises a downwardly facing, elastic bumper. Preferably, the bumper is of highly elastic rubber and is relatively thick to ensure that the traveling block does not completely compress the bumper to impact the beams. Preferably, the bumper is at least 16" thick. The bumper may also have projections on its lower face for contacting the traveling block and resisting slipping.

This arrangement enhances safety of a drilling derrick by providing personnel with both an audible and visible indication of the traveling block height as it approaches the crown block. The audible and visible alarms are both completely mechanical in nature, and thus not subject to failure as a result of power cuts or electrical circuit problems. Additionally, an improved bumper at the top of the derrick cushions the impact if personnel should ignore these alarms.

BRIEF DESCRIPTION OF THE DRAWINGS

The present invention will be better understood from the following detailed description of a preferred embodiment of the invention, taken in conjunction with the accompanying drawings, in which like reference numerals have been used for like parts, and in which:

FIG. 1 is a front view of a typical derrick with a safety apparatus according to a preferred embodiment of the invention;

FIG. 2 is a side view of the upper portion of FIG. 1;

DESCRIPTION OF THE PREFERRED EMBODIMENT

Figure 3:
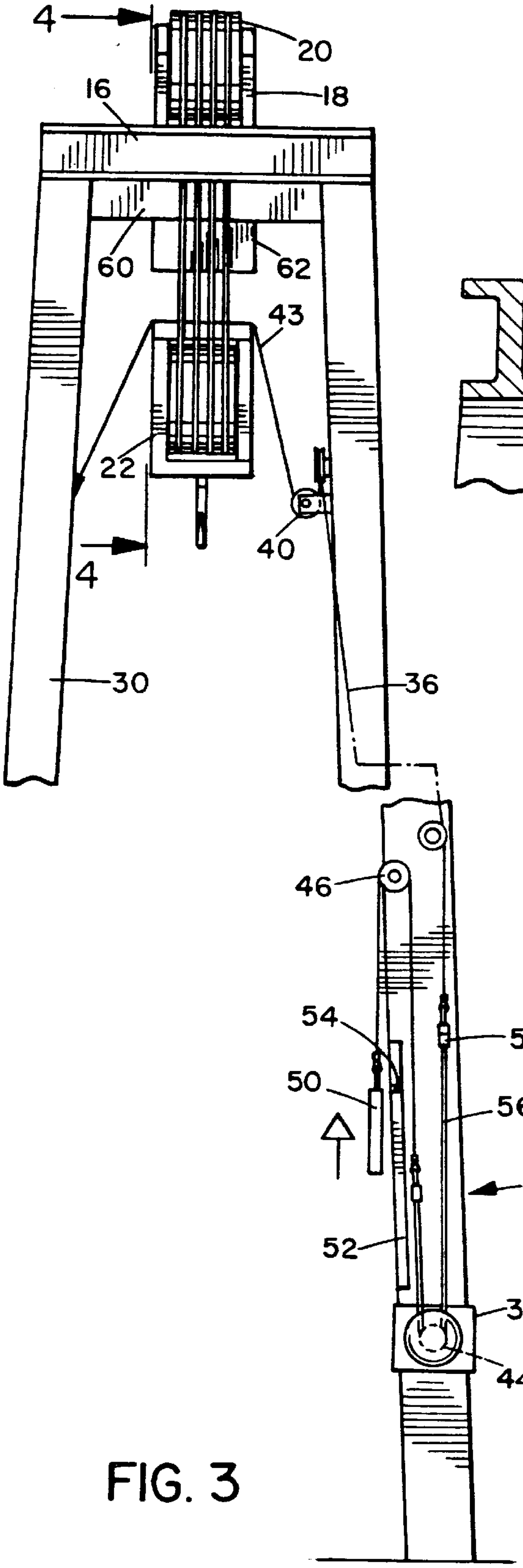
FIG. 3 is a view similar to FIG. 1, but with the traveling block engaging the warning cable.

FIGS. 1–3 of the drawings illustrate a typical oil drilling derrick 10 on which a safety apparatus according to a preferred embodiment of the present invention has been installed. The safety apparatus is in two parts, comprising a warning or alarm system 12, and a bumper block 14 mounted at the top of the derrick. Although the safety apparatus is described in the preferred embodiment for use on an oil drilling derrick, it may also be used on other types of hoisting equipment such as hoisting cranes and hoist units for mine shafts and the like.

As is known in the field, a typical oil drilling derrick 10 has an upper end 16 on which a crown block 18 carrying a stack of sheaves or pulleys 20 is mounted. A traveling block 22 is suspended from crown block 18 via cables 24 which extend around the pulleys 20 on crown block 18 as well as a series of pulleys 26 on traveling block 22. A hook 28 or the like depends from the lower end of block 22 for hoisting pipes and drilling equipment. The derrick 10 itself is a vertical framework of upwardly extending bars or struts 30 and crossbars or struts 32 defining a generally square cross-section of gradually decreasing dimensions. A suitable drive unit (not illustrated) is provided for driving the traveling block up and down the derrick. It is well known in the field that damage and potential injuries may result if the traveling block is allowed to travel up the derrick until it impacts the top of the derrick.

The safety apparatus of this invention may be installed in any conventional drilling derrick, and provides a warning or alarm signal before the traveling block hits the top of the derrick. The alarm assembly 12 basically comprises an alarm device 34 such as an alarm bell or buzzer mounted adjacent the lower end of the derrick, and cable 36 linked to the alarm device and extending partially around a series of small guide pulleys 38 at spaced intervals upwardly along an upright strut 30 to a predetermined position adjacent the upper end of the derrick. The cable extends from the uppermost guide pulley 38 along a cross strut 32 to a pair of guide pulleys 39,40 adjacent the center of cross strut 32. The cable extends from the final pulley 40 across the derrick to the opposite side, where it is secured to the center of an opposing cross strut (not illustrated) via fixed connection 42. Thus, the cable 36 extends from a first end secured to connection 42 adjacent the upper end of the derrick in a path across the derrick, and then down one side of the derrick to alarm device 34. A portion 43 of the cable therefore extends across the central region of the derrick in the path of the traveling block 22.

Preferably, the cable extends around a rotor 44 in alarm device 34, around an idler pulley 46 located above alarm device 34, and the second end 48 of the cable is then secured to a counterweight 50 suspended from idler pulley 46. A suitable scale 52 is marked on the vertical strut 30 adjacent the counterweight 50, as best illustrated in FIGS. 1 and 3. The scale will include suitable spaced markings (not illustrated) similar to a yardstick, and a warning mark or red line 54 indicating a danger point beyond which the traveling block should not be raised. The scale is set up to indicate the distance of the traveling block from the crown, from 12' onwards, with the red mark indicating that the traveling block is only 1' from the crown. The cable is preferably not a continuous length of identical cable material, but comprises two end portions extending from the first and second ends of the cable, respectively, which are of steel cable, and an intermediate portion 56 extending around the alarm device rotor 44 which is of stainless steel roller chain, in order to actuate the rotor when the cable is pulled up. Opposite ends of roller chain portion 56 are secured to the respective cable portions via Crosby clamps 58 and swivels 59.

The cable portion 43 extending across the width of the derrick adjacent the upper end is arranged to be in the path of the traveling block as it travels up the derrick. The cable portion 43 is at a predetermined distance below the upper end of the derrick, preferably at around 12'. The portion of cable suspended below idler pulley to which the counter weight is attached is of predetermined length when the counter weight is in the fully lowered position of FIG. 1. The distance below the idler pulley in this position is preferably of the order of 24'.

Figure 4:
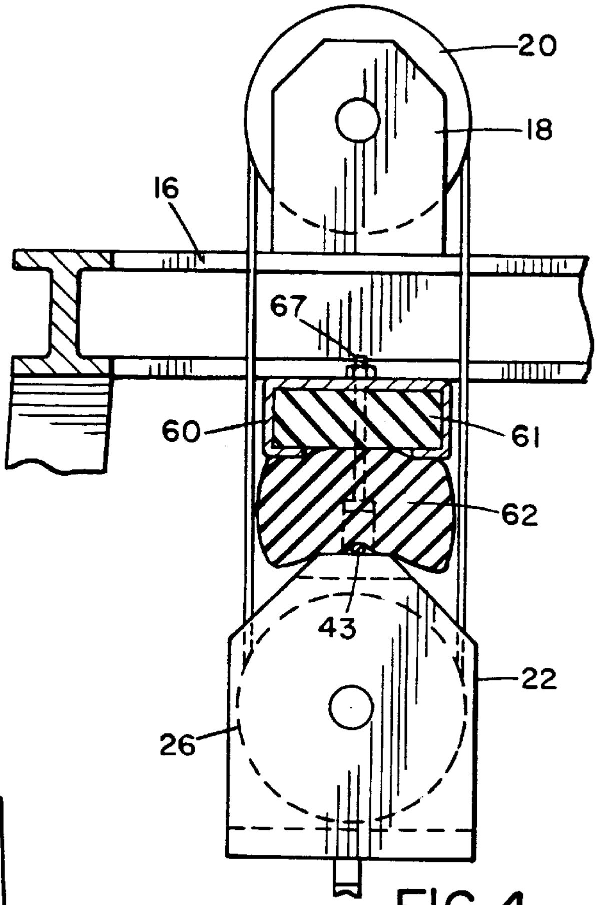
FIG. 4 is an enlarged sectional view taken on line 4—4 of FIG. 3, but with the traveling block further raised into contact with the bumper block.
Figure 5:
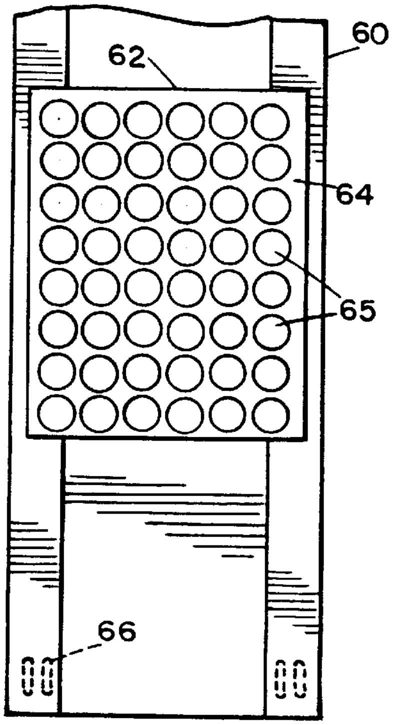
FIG. 5 is an enlarged view of the underside of the bumper block showing the friction pads.

The bumper block 14 is illustrated in more detail in FIGS. 4 and 5. Block 14 is secured across the upper end of the derrick so as to face downwardly toward the traveling block. The bumper 14 basically comprises a steel channel 60 bolted across the upper end of the derrick, a rubber insert block 61 extending along the channel, and a bumper pad 62 of highly elastic, cushioning material secured to the insert block 61 so as to project downwardly from the channel, as best illustrated in FIG. 4. Pad 62 is of rectangular cross-section and has a predetermined thickness or depth sufficient to absorb impact with the traveling block, which may be pulled into pad 62 at 150,000 pounds line pull. Preferably, the block 61 and bumper pad 62 have a combined depth of at least 16', and preferably of around 18" to 20". The pad is preferably of highly elastic natural rubber or equivalent materials.

The lower face 64 of the bumper pad 62 preferably has a suitable non-flat configuration for frictional engagement with the traveling block if impact occurs. As best illustrated in FIG. 5, the face 64 has a series of raised, circular friction bumps or pads 65 for improving adhesion with the traveling block and resisting slippage. Other surface configurations for improving frictional resistance to slipping may be used instead of the circular bumps or protrusions 65 of the illustrated embodiment.

The bumper support channel 60 is preferably of high strength, low temperature rated material. In a preferred embodiment, channel 60 is made of low temperature rated, high yield steel, such as A537 steel. The channel is very strong and will not shatter or be damaged by impact with the traveling block. Insert block 61 further cushions the channel 60 against any damage on impact. Channel 60 is securely bolted to the upper end struts via suitably strong bolts or the like (not illustrated) extending through slots 66, and the bumper pad 62 is also suitably bolted to the insert block 61 via bolts 67.

This arrangement provides a reliable warning device for ensuring personnel have an adequate warning to turn off the traveling block, as well as an impact cushioning pad to cushion the impact should the warning be ignored. The warning device 12 may be used instead of or in addition to an electrical cut off switch arrangement such as a Crown-O-Matic unit. As the traveling block moves up the derrick, at a certain height it will meet the portion 43 of the cable 36. If the traveling block is raised beyond the position illustrated in FIG. 1, it will simultaneously pull up on the cable 36, actuating the alarm bell or unit 34 as the roller chain rotates the rotor of alarm unit 34. The counterweight 50 is also raised, providing an indication of the spacing of the traveling block below the crown block or upper end of the derrick. Thus, the operator has an eye level indication of how far the counterweight is from the crown block, without having to look up at the traveling block through the derrick. The operator will be aware that the traveling block is dangerously close to the crown block when the counterweight is close to the red or danger mark on the scale.

If the operator should ignore both of these warnings and fail to switch off the traveling block drive, the block will be pulled into the bumper pad, which is sufficiently thick and elastic to cushion the impact and reduce the risk of damage to either the support beams or the overlying crown structure, or to the traveling block and its pulleys. The risk of debris falling to the platform as a result of such an impact is therefore considerably reduced over prior art arrangements.

With this invention, the rig operator receives both an audible and a visual warning of impending impact of the traveling block with the crown, in sufficient time to allow the operator to turn off the drive motor well before impact would occur. At the same time, the improved bumper arrangement at the top of the derrick will reduce the risk of damage to the crown block or traveling block, as well as the risk of falling debris causing damage or injury, should the operator choose to ignore the warning signals. Thus, derrick operation will be substantially safer with installation of the safety apparatus of this invention.

Because the safety or warning apparatus of this invention is completely mechanical, it will be more reliable than prior, electrically operated safety devices such as the known Crown-O-Matic limit switch arrangement. The safety unit is totally mechanically activated and cannot be shut off by rig personnel once installed without the aid of a cutting torch. Thus, circumvention of the unit is unlikely.

Although a preferred embodiment of the invention has been described above by way of example only, it will be understood by those skilled in the field that modifications may be made to the disclosed embodiment without departing from the scope of the invention, which is defined by the appended claims.

I claim:

1. A safety apparatus for a hoist unit, comprising:

a cable of predetermined length sufficient to extend from a first position adjacent a crown of a hoist unit and a second position adjacent a lower end of the unit, the cable having a first end for connection to a hoist unit adjacent the crown of the unit and a second end, a series of pulleys for securing to the unit to define a predetermined cable path extending into a travel path of a traveling block traveling up the unit at a predetermined spacing below the crown of the unit and down one side of the unit to a location adjacent a lower end of the hoist unit at a surface on which the unit is mounted;

the cable being adapted to be located in the path of a traveling block moving up the hoist unit towards the crown; and an alarm device for mounting at the lower end of the hoist unit linked to the second end of the cable for actuation by the cable to produce an output alarm signal if the cable is pulled up by the traveling block as it approaches the top of the unit.

2. The apparatus as claimed in claim 1, wherein the alarm device is an audible alarm.

3. The apparatus as claimed in claim 2, wherein the alarm device further includes a visible indicator device for indicating the spacing of the traveling block below the crown.

4. The apparatus as claimed in claim 1, wherein the cable has a second end, a counterweight is secured to the second end of the cable, and a scale is secured to the unit adjacent said counterweight, the scale having a plurality of markings for indicating the spacing of the traveling block below the crown, whereby the counterweight is raised along the scale as the traveling block pulls up the cable.

5. The apparatus as claimed in claim 4, wherein the length of the scale is at least 12'.

6. The apparatus as claimed in claim 1, further including a bumper device adapted to be positioned at the crown of the unit to cushion any impact with the traveling block if it is pulled to the crown without stopping.

7. The apparatus as claimed in claim 6, wherein the bumper device comprises a metal channel secured across the unit and having a downwardly facing channel opening, a cushioning pad mounted in the channel, and a downwardly facing, elastic bumper pad secured to the cushioning pad and projecting downwardly from the channel.

8. The apparatus as claimed in claim 7, wherein the bumper pad is of highly elastic rubber.

9. The apparatus as claimed in claim 8, wherein the bumper pad has a thickness of at least 12".

10. The apparatus as claimed in claim 9, wherein the bumper pad is approximately 18" to 20" thick.

11. The apparatus as claimed in claim 7, wherein the bumper pad has a lower face having a plurality of gripping projections for frictional gripping engagement with the traveling block if the traveling block is pulled up against the bumper pad.

12. The apparatus as claimed in claim 11, wherein the projections are of circular, disc-like shape.

13. An oil drilling rig apparatus, comprising:

a derrick having a lower end for mounting on a platform, an upwardly projecting frame, and an upper, crown end;

a crown block mounted on the crown end of the derrick;

a traveling block suspended from the crown block within the derrick frame;

drive means linked to the traveling block for driving the traveling block up and down the frame in a predetermined travel path;

a safety assembly mounted on the frame, the safety assembly comprising a cable having a first end secured to the frame at a predetermined spacing below the crown end and a second end, a series of pulleys secured at spaced intervals on the frame to define a predetermined cable path having a first cable portion extending into said travel path at said predetermined spacing below the crown of the derrick and a second cable portion extending down the side of the frame to a location adjacent the lower end of the derrick at a platform on which the derrick is mounted;

the first cable portion being located in the path of the traveling block as it moves up the derrick towards the crown, whereby the traveling block will pull the cable up if it moves upwardly beyond said predetermined spacing below the crown; and an alarm device mounted adjacent the lower end of the derrick and linked to the second end of the cable for actuation by the cable to produce an output alarm signal if the cable is pulled up by the traveling block as it approaches the top of the derrick.

14. The apparatus as claimed in claim 13, wherein said predetermined spacing is at least 12'.

15. The apparatus as claimed in claim 13, wherein the alarm device is an audible alarm.

16. The apparatus as claimed in claim 15, wherein the alarm device further includes a visible indicator device for indicating the spacing of the traveling block below the crown.

17. The apparatus as claimed in claim 13, wherein the cable has a second end, a counterweight is secured to the second end of the cable, and a scale is secured to the derrick adjacent said counterweight, the scale having a plurality of markings for indicating the spacing of the traveling block below the crown, whereby the counterweight is raised along the scale as the traveling block pulls up the cable.

18. The apparatus as claimed in claim 17, wherein the length of the scale is at least 12'.

19. The apparatus as claimed in claim 13, further including a bumper device secured to the crown end of the derrick and facing downwardly to cushion any impact with the traveling block if it is pulled to the crown without stopping.

20. The apparatus as claimed in claim 19, wherein the bumper device comprises a support channel secured across the derrick, and a downwardly facing, elastic bumper pad secured to the channel.

21. The apparatus as claimed in claim 20, wherein the bumper pad is of highly elastic rubber.

22. The apparatus as claimed in claim 21, wherein the bumper pad has a thickness of at least 12".

23. The apparatus as claimed in claim 22, wherein the bumper pad is approximately 18" to 20" thick.

24. The apparatus as claimed in claim 20, wherein the bumper pad has a lower face having a plurality of gripping projections for frictional gripping engagement with the traveling block if the traveling block is pulled up against the bumper pad.

25. The apparatus as claimed in claim 24, wherein the projections are of circular, disc-like shape.

26. The apparatus as claimed in claim 20, wherein the support channel is of high strength, low temperature rated metal.

27. The apparatus as claimed in claim 26, wherein the metal is steel.

28. A method of providing a warning to personnel at an oil drilling derrick prior to impact of a traveling block with a crown block of the derrick, comprising the steps of:

securing one end of a cable to the derrick at a location spaced below the crown block and extending the cable into a travel path of the traveling block at that location, and then extending the cable downwardly around a series of pulleys to a location adjacent a lower end of the derrick mounted on a platform;

coupling an alarm unit to a second end of the cable adjacent the lower end of the derrick such that the alarm unit is activated if the cable is pulled upwardly;

driving the traveling block up the derrick until it contacts the cable extending into its path and pulls the cable up to activate the alarm unit; and switching off the drive to stop the traveling block in the event that the alarm unit is activated.

* * * * *